United States Patent
Castille et al.

(10) Patent No.: US 7,546,392 B2
(45) Date of Patent: Jun. 9, 2009

(54) DATA TRANSFER WITH SINGLE CHANNEL CONTROLLER CONTROLLING PLURAL TRANSFER CONTROLLERS

(75) Inventors: Roger K. Castille, Houston, TX (US); Natarajan Kurian Seshan, Bellaire, TX (US); Henry Duc C. Nguyen, Houston, TX (US); Marco Lazar, Houston, TX (US); Jason A. T. Jones, Richmond, TX (US)

(73) Assignee: Texas Instruments Incorporated, Dallas, TX (US)

( * ) Notice: Subject to any disclaimer, the term of this patent is extended or adjusted under 35 U.S.C. 154(b) by 224 days.

(21) Appl. No.: 11/383,063

(22) Filed: May 12, 2006

(65) Prior Publication Data

US 2006/0259660 A1    Nov. 16, 2006

Related U.S. Application Data (60) Provisional application No. 60/680,974, filed on May 13, 2005.

(51) Int. Cl.
*G06F 13/28* (2006.01)
*G06F 13/36* (2006.01)
*G06F 15/167* (2006.01)
*G06F 12/00* (2006.01)

(52) U.S. Cl. .......................... 710/22; 710/25; 710/26; 710/28; 710/308; 709/212; 711/1

(58) Field of Classification Search ............ 710/5, 710/22, 36, 40, 25, 26, 28, 308; 709/212; 711/1
See application file for complete search history.

(56) References Cited

U.S. PATENT DOCUMENTS

| | | | | |
|---|---|---|---|---|
| 6,574,683 | B1 * | 6/2003 | Comisky et al. | 710/23 |
| 6,721,822 | B2 * | 4/2004 | Barry et al. | 710/33 |
| 2001/0038634 | A1 * | 11/2001 | Dally et al. | 370/412 |
| 2003/0110325 | A1 * | 6/2003 | Roach et al. | 710/22 |
| 2006/0080478 | A1 * | 4/2006 | Seigneret et al. | 710/22 |

* cited by examiner

*Primary Examiner*—Henry W. H. Tsai
*Assistant Examiner*—Steven G Snyder
(74) *Attorney, Agent, or Firm*—Robert D. Marshall, Jr.; Wade J. Brady, III; Frederick J. Telecky, Jr.

(57) ABSTRACT

A data transfer control apparatus includes a channel controller and plural transfer controllers. The channel controller receives, prioritizes and queues data transfer requests. An event to transfer controller table enables recall of a transfer controller number corresponding to the data transfer request. The plural transfer controllers are independent and can operate simultaneously in parallel. Each transfer controller includes a read bus interface and a write bus interface which arbitrate with other bus masters in the case of blocking accesses directed to interfering devices or address ranges.

3 Claims, 9 Drawing Sheets

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSV | | | | | | | | | TCCH EN | RSV | TCINT EN | RSV | | TCC | |
| R+0 | | | | | | | | | RW+0 | R+0 | RW+0 | R+0 | | RW+0 | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| TCC | | | | RSV | | FWID | | RSV | | PRI | | RSV | | DAM | SAM |
| RW+0 | | | | R+0 | | RW+0 | | R+0 | | RW+0 | | R+0 | | RW+0 | |

FIG. 6

| 31 | | 0 |
|---|---|---|
| | SADDR | |
| | PSRC, RW+0 OTHERS, R+0 | |

FIG. 7

| 31 | | 0 |
|---|---|---|
| | DADDR | |
| | PDST, RW+0 OTHERS, R+0 | |

FIG. 8

| 31 | | 16 | 15 | | 0 |
|---|---|---|---|---|---|
| | BCNT | | | ACNT | |
| | PCNT, RW+0 OTHER, R+0 | | | PCNT, RW+0 OTHER, R+0 | |

FIG. 9

| 31 | | 16 | 15 | | 0 |
|---|---|---|---|---|---|
| | DBIDX | | | SBIDX | |
| | PBIDX, RW+0 OTHER, R+0 | | | PBIDX, RW+0 OTHER, R+0 | |

DATA TRANSFER WITH SINGLE CHANNEL CONTROLLER CONTROLLING PLURAL TRANSFER CONTROLLERS

CLAIM OF PRIORITY

This application claims priority under 35 U.S.C. 119(e)(1) to U.S. Provisional Application No. 60/680,974 filed May 13, 2005.

TECHNICAL FIELD OF THE INVENTION

The technical field of this invention is data transfer controller and data transfer operations.

BACKGROUND OF THE INVENTION

Figure 1:
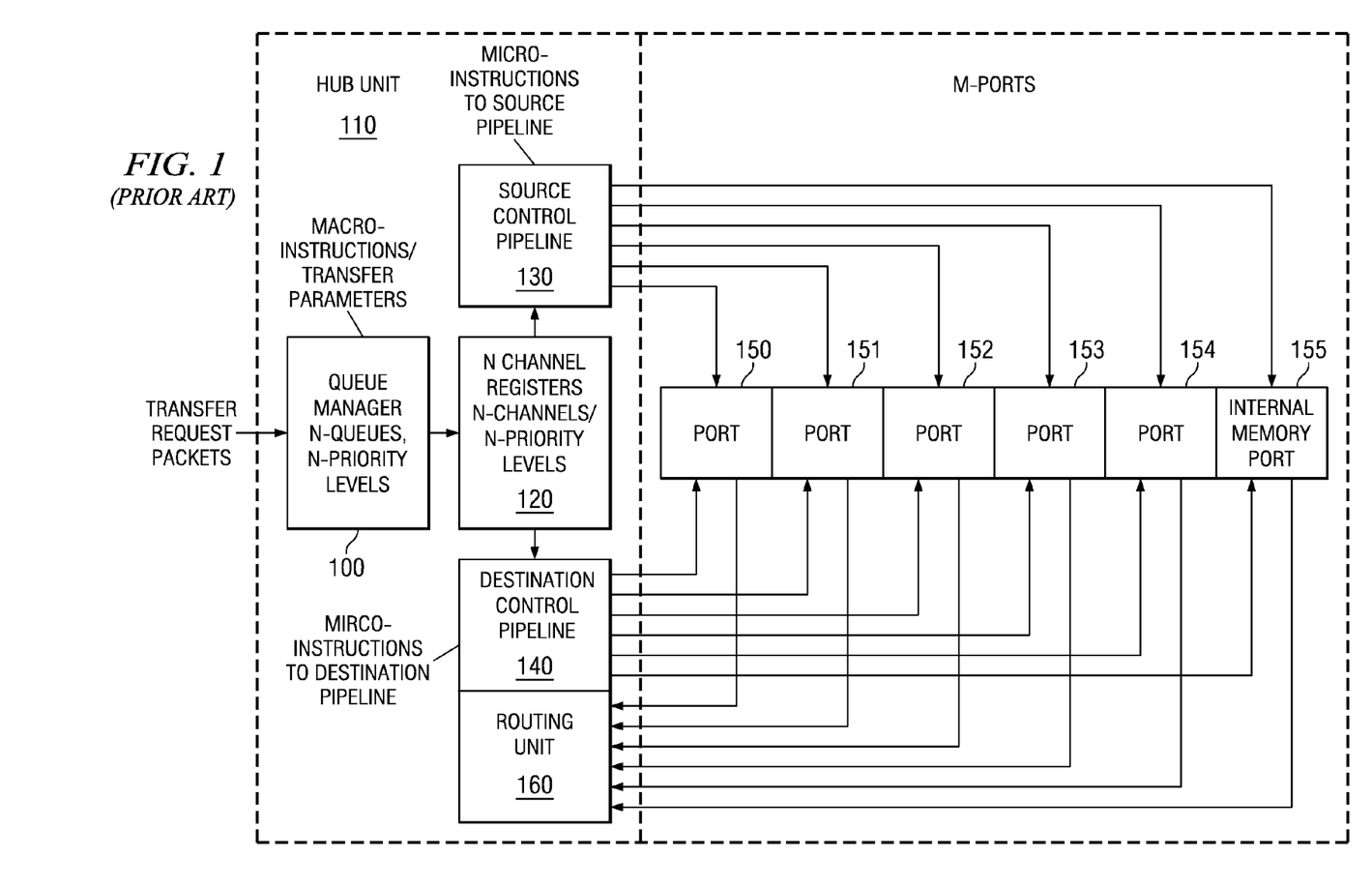
FIG. 1 illustrates a block diagram of the basic principal features of a transfer controller with hub and ports architecture transfer controller with hub and ports.

FIG. 1 illustrates a block diagram of the basic features of the transfer controller with hub and ports. The transfer controller with hub and ports is basically a data transfer controller which has at its front end portion, a queue manager 100 receiving, prioritizing and dispatching data in the form of transfer request packets. This queue manager 100 connects within the hub unit 110 to the channel registers 120. Channel registers 12 receives the data transfer request packets and processes them first by prioritizing them and assigning them to one of the N channels. Each channel represents a priority level. These channel registers 120 interface with the source control pipeline 130 and destination control pipeline 140. These are address calculation units for source (read) and destination (write) operations.

Outputs from these pipelines are broadcast to M Ports (six shown in FIG. 1 as 150 through 155). The ports 150 to 155 are clocked either at the main processor clock frequency or at a lower external device clock frequency. Read data from one port, e.g. port 150, having a destination write address of port 153 is returned to the hub destination control pipeline through the routing unit.

The transfer controller with hub and ports, to which this invention relates, introduces several new ideas supplanting the previous transfer controller technology. First, it is uniformly pipelined. In the previous transfer controller designs, the pipeline was heavily coupled to the external memory type supported by the device. In the preferred embodiment, the transfer controller with hub and ports contains multiple external ports, all of which look identical to the hub. Thus peripherals and memory may be freely interchanged without affecting the transfer controller with hub and ports. Secondly, the transfer controller with hub and ports concurrently executes transfers. That is, up to N transfers may occur in parallel on the multiple ports of the device, where N is the number of channels in the transfer controller with hub and ports core. Each channel in the transfer controller with hub and ports core is functionally just a set of registers. These registers track the current source and destination addresses, the word counts and other parameters for the transfer. Each channel is identical, and thus the number of channels supported by the transfer controller with hub and ports is highly scalable. Thirdly, the transfer controller with hub and ports includes a mechanism for queuing transfers up in a dedicated queue RAM.

Figure 2:
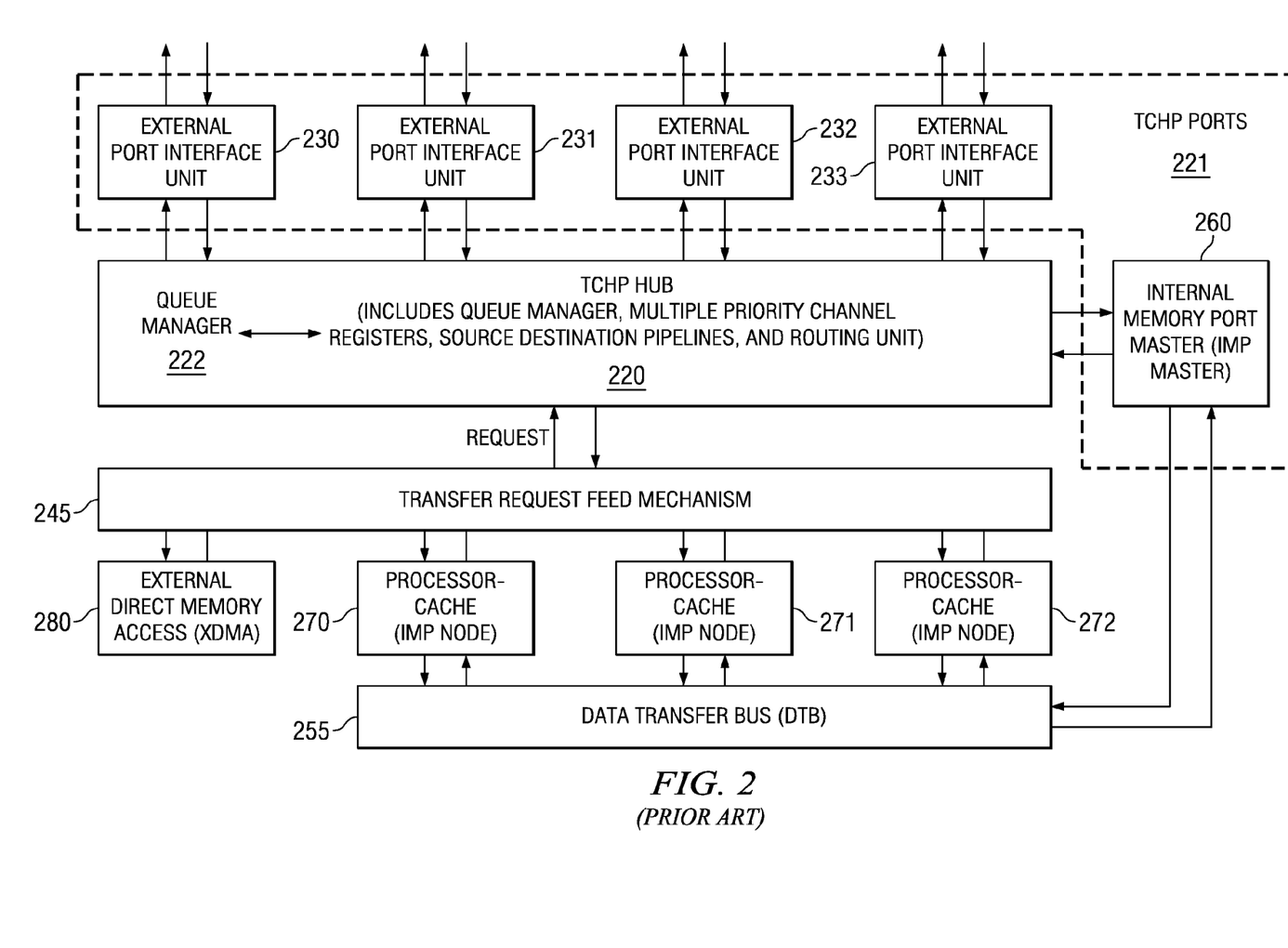
FIG. 2 illustrates the multi-processor machine with transfer controller with hub and ports architecture functional block relating to this invention, showing from a higher level, the essential elements of the transfer controller with hub and ports and its associated functional units.

FIG. 2 illustrates from a higher level an overview of an example multiprocessor integrated circuit employing the transfer controller with hub and ports of this invention. There are four main functional blocks. The transfer controller with hub and ports 220 and the ports including ports external port interface units 230 to 233 and internal memory port 260 are the first two main functional blocks. Though four external port interface units 230, 231, 232 and 233 are illustrated, this is an example only and more or fewer could be employed. The other two main functional blocks are the transfer request feed mechanism 245 and the data transfer bus (DTB) 255. These are closely associated functional units that are but not a part of the transfer controller with hub and ports 220. Transfer request feed mechanism 245 is coupled to plural internal memory port nodes 270, 271 and 272. Though three internal port nodes 270, 271 and 272 are illustrated, this is an example only and more or fewer could be employed. Each of these internal memory port nodes preferably includes an independently programmable data processor, which may be a digital signal processor and corresponding cache memory or other local memory. The internal construction of these internal memory port nodes 270, 271 and 272 is not important for this invention. For the purpose of this invention it sufficient that each of the internal memory port nodes 270, 271 and 272 can submit transfer requests via transfer request feed mechanism 245 and has memory that can be a source or destination for data. Transfer request feed mechanism 245 prioritizes these packet transfer requests in a manner not relevant to this invention. Transfers originating from or destined for internal memory port nodes 270, 271 or 272 are coupled to transfer controller with hub and ports 220 via data transfer bus 255 and internal memory port master 260. FIG. 2 highlights the possible connection of data transfer bus 255 to multiple internal memory port nodes 270, 271 and 272 and the possible connection of multiple transfer request nodes to transfer request feed mechanism 245.

SUMMARY OF THE INVENTION

The data transfer control apparatus for this invention includes a channel controller and plural transfer controllers. The channel controller receives, prioritizes and queues data transfer requests. An event to transfer controller table enables recall of a transfer controller number corresponding to the data transfer request. The transfer controller controls data source and data destination in a data transfer corresponding to the data transfer requests.

The plural transfer controllers are independent and can operate simultaneously in parallel. Each transfer controller includes a read bus interface and a write bus interface. These read and write bus interfaces are bus masters which arbitrate with other bus masters on a data bus in the case of blocking accesses directed to interfering devices or address ranges.

BRIEF DESCRIPTION OF THE DRAWINGS

These and other aspects of this invention are illustrated in the drawings, in which.

DETAILED DESCRIPTION OF PREFERRED EMBODIMENTS

Figure 3:
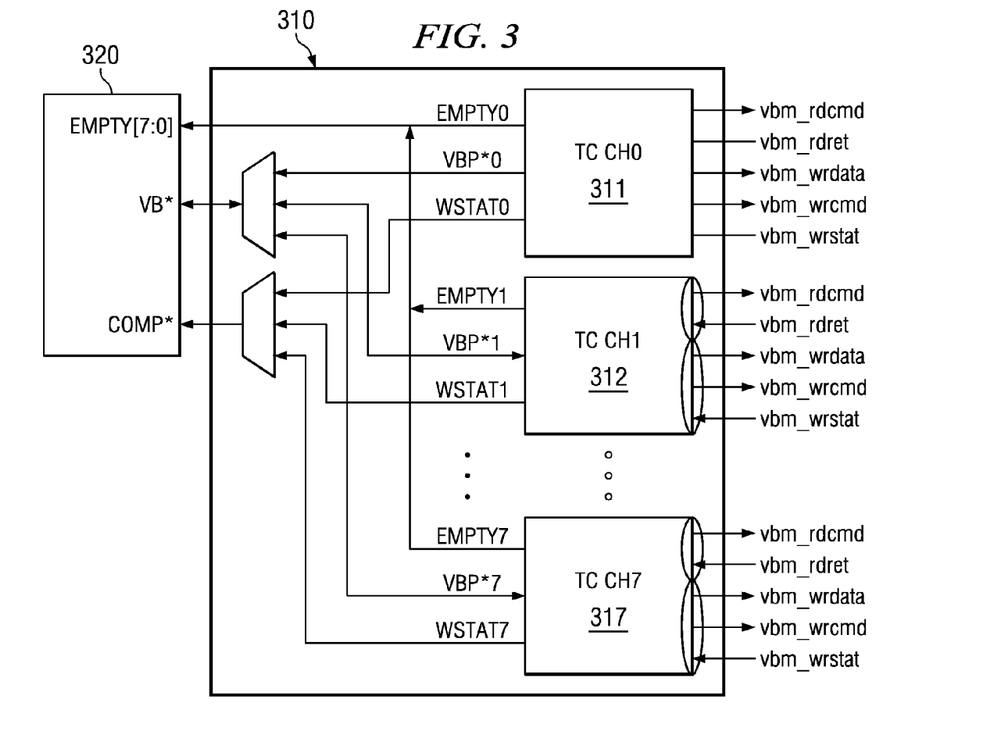
FIG. 3 illustrates an improved hub unit of this invention.

FIG. 3 illustrates an improved hub unit of this invention. The improved hub unit includes two major blocks transfer controller 311 and channel controller 320. Programmed DMA transfers involve two slave endpoints such as a slave peripheral and a memory, or between two slave memories.

As shown in FIG. 3, one channel controller 320 can control a group 310 of transfer controllers 311, 312 to 317. The transfer controllers 311, 312 to 317 perform read and write transfers via the ports to the slave peripherals as programmed in the active and pending register sets. As illustrated in FIG. 3 the preferred data transfer bus is a VBus. This will be further described below.

Channel controller 320 serves as the user interface and event interface for the data transfer system. In the preferred embodiment each channel controller 320 can support up to 64 event triggered channels and 8 auto-triggered or link-triggered channels. Channel controller 320 includes a scalable parameter RAM (PaRAM) that supports flexible ping-pong, circular buffering, channel-chaining, auto-reloading and memory protection.

Figure 4:
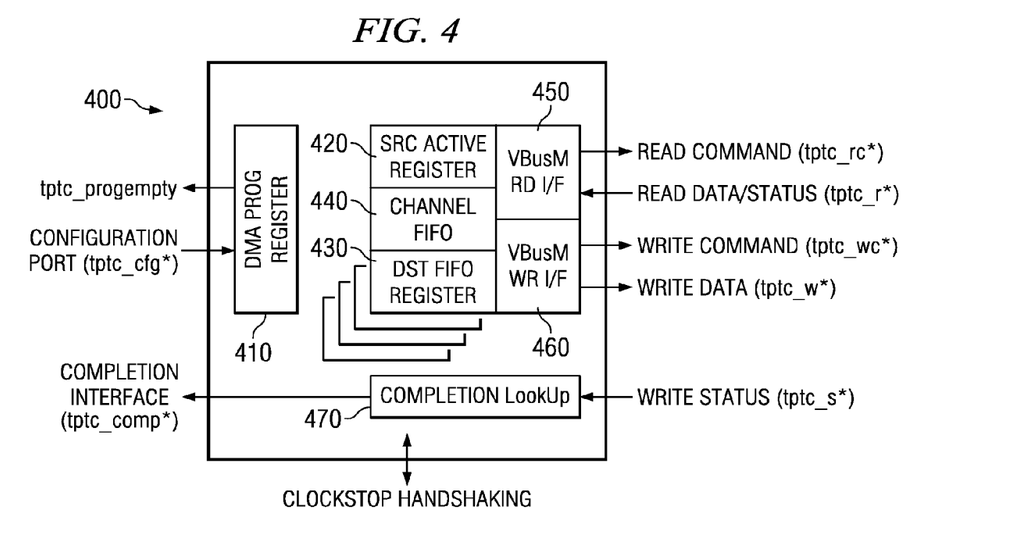
FIG. 4 illustrates the components of a transfer controller such as illustrated in FIG. 3.

FIG. 4 illustrates the components of a transfer controller such as transfer controllers 311, 312 to 317 illustrated in FIG. 3. Each transfer controller 400 includes program register set 410, source active register set 420, destination FIFO register set 430, channel FIFO 440, read controller 450, write controller 460 and bus completion interface 470.

Program register set 410 stores the context for a next DMA transfer that will be loaded into the active register sets upon completion of the current data transfer. A system data processor (CPU) or channel controller 320 programs the program register set 410 not the active register sets. Each transfer controller 400 can operate in a standalone mode or in as slave to a corresponding channel controller 320. For a typical standalone operation, a CPU programs the program register set 410 while the transfer controller 400 operates a data transfer controlled by the active register sets. In the preferred embodiment program register set 410 includes ownership control so that CPU software and the transfer controller are synchronized. In the preferred embodiment all registers in program register set 410 are memory mapped and can be written to by the CPU and by the corresponding channel controller 320.

Source active register set 420 stores the context for source, destination and count parameters for the current data transfer in the read controller. Source active register set 420 is split into independent source and destination register halves since the source VBus controller and destination VBus controller operate independently.

Destination FIFO register set 430 stores the context for source, destination and count parameters for the current data transfer in the write controller. The pending register sets are necessary to allow the source controller to begin processing a new data transfer while the destination register set is still processing the previous data transfer.

Channel FIFO 440 temporarily buffers in-flight data. Channel FIFO 440 stores return data from the source peripheral and subsequently writes to the destination peripheral via the write command/data bus.

Read controller/bus read interface 450 is a VBus master command interface capable of issuing only read commands and a VBus master read return interface. The read controller/bus read interface 450 issues optimally sized read commands to the source peripheral based on a default burst size (DBS) and the available space in channel data FIFO 440. Read controller/bus read interface 450 arbitrates with other bus masters on the VBus in the case of blocking accesses directed to interfering devices or address ranges.

Write controller/bus write interface 460 is a VBus master command interface capable of issuing only write commands and a VBus master write data interface. Write controller/bus write interface 460 issues optimally sized write commands to the destination peripheral based on the default burst size and data present in channel FIFO 440. Write controller/bus read interface 460 arbitrates with other bus masters on the VBus in the case of blocking accesses directed to interfering devices or address ranges.

Bus completion interface 470 is responsive to write status information to send completion information to channel controller 320. This permits posting interrupts within channel controller 320.

Transfer controller 400 includes three similar sets of registers including program register set 410, source active register set 420 and destination FIFO register set 430. The similar registers will be described together. Each of these register sets includes an options register, a source address register, a destination register, a count register, a B dimension source and destination index register.

Figure 5:
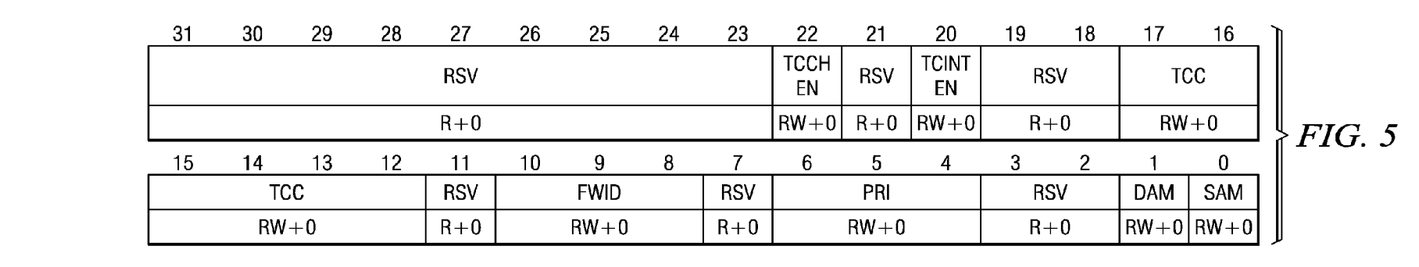
FIG. 5 illustrates the options register.

FIG. 5 illustrates the options register. The options registers include fields controlling source address mode (SAM), destination address mode (DAM) and FIFO width (FWID). The source address mode field controls whether the source array is from an incrementing addresses or from a single FIFO address. The destination address mode similarly determines if the destination array is to an incrementing address or to a single FIFO address. The FIFO width field determines the width of memory elements in channel FIFO 440. This preferably encodes a number of data widths from 8 bits to 256 bits.

Figure 6:
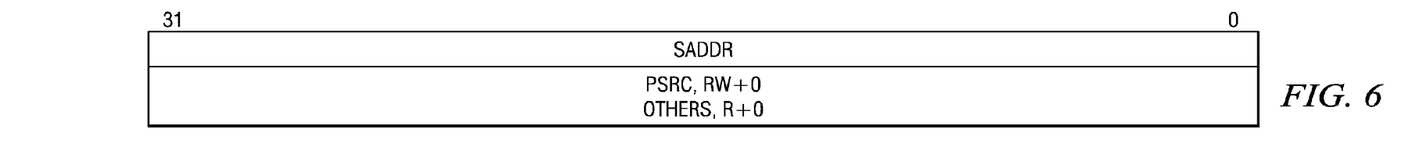
FIG. 6 illustrates the source address register.
Figures 7, 8:
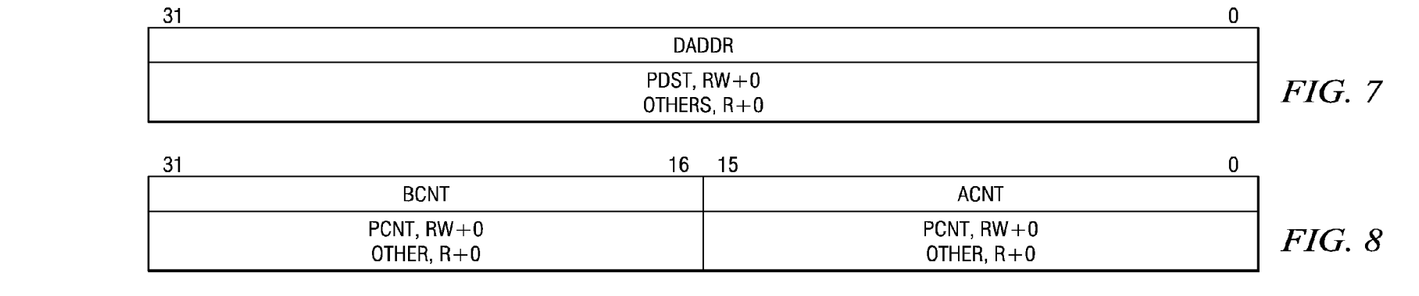
FIG. 7 illustrates the destination address register.
FIG. 8 illustrates the count register.

FIG. 6 illustrates the source address register. The source address register stores the address of the data source for the corresponding data transfer. FIG. 7 illustrates the destination address register. The destination address register stores the address of the data destination for the corresponding data transfer.

FIG. 8 illustrates the count register. The count register is preferably a 32-bit register storing two 16-bit counts. An A count (ACNT) sets the number of bytes in each array. A B count (BCNT) sets the number of arrays in each data transfer.

Figure 9:
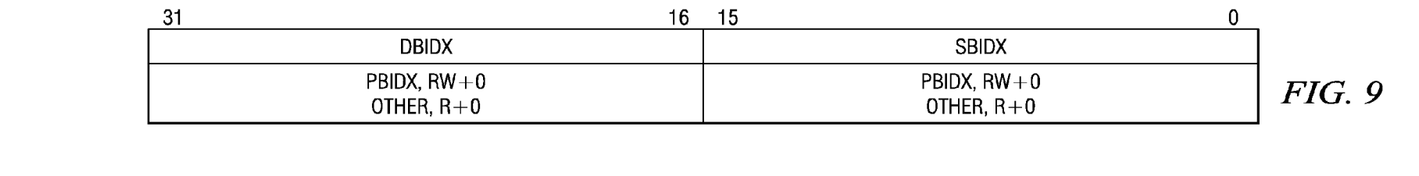
FIG. 9 illustrates the B dimension index register.
Figure 10:
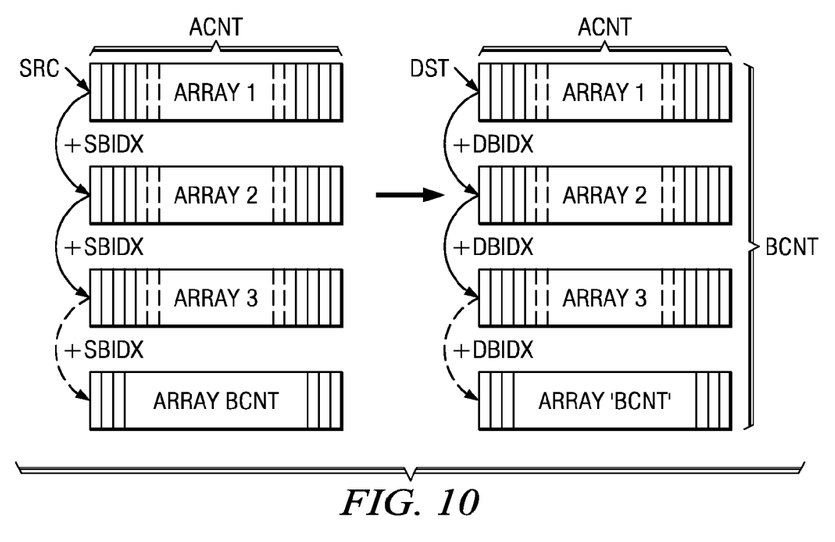
FIG. 10 illustrates the meanings of the B dimension index fields.

FIG. 9 illustrates the B dimension index register. The B dimension index register includes a destination B dimension index field (DBIDX) and a source B dimension index field (SBINDX). The B dimension index fields DBIDX and SBIDX set the address offset between starting addresses of the corresponding destination and source arrays. This is illustrated in FIG. 10 which shows the source and destination memory address areas of a data transfer. Each array has a number of memory addresses equal to ACNT. There are a number of these arrays equal to BCNT. The address difference between source arrays is SBINX and the destination difference between destination arrays is DBINX.

These register sets are programmed differently. Program writes to the options register FWID field, the count registers ACNT and BCNT fields apply to both the source and destination operations. Program writes to the options register SAM and DAM fields, the source address register, the destination address register and the B dimension source and destination index register SBIDX and DBIDX fields control only the corresponding source or destination portions the data transfer.

The source active register set 420 and the destination FIFO register set 430 store the operating parameters for transfer controller 400. The source and destination address registers are updated during the data transfer. The BCNT portion of the count register stores the number of remaining arrays to be transferred and also updates during the data transfer. Data stored in the program register set 410 is for the next data transfer. This data is not changed during a data transfer. Instead at the end of a data transfer data stored in program register set 410 is written into both source active register set 420 and destination FIFO register set 430 to define the parameters of the next data transfer. As noted above, program register set 410 includes similar data registers and similar data fields as source active register set 420 and destination FIFO register set 430.

The operation of the various registers and fields can be summarized as follows. The options registers fields are static. The B dimension index register SBINDX and DBINDX fields are static. The source address register and destination address register update during data transfers to point to the next addresses. The count register BCNT field updates to the number of remaining arrays to be transferred. As will be detailed below, these changing fields are separately handled for source and destination.

When a data transfer completes, transfer controller 400 does not clear any registers. The register fields change only when overwritten from data in program register set 410. Thus upon completion of a data transfer source address register and destination address register store the address of the last read or write command. In addition, the BCNT fields have a value of 0.

Data transfers are defined by writing to the data registers in the program register set 410. This write is preferably via a VBus configuration interface. This write generally comes from the corresponding channel controller 320 but could come from any VBus master device such as the CPU. A VBus master write to the B dimension index register in the program register set 410 triggers the data transfer. Program register set 410 writes its data into source active register set 420 and destination FIFO register set 430. This data write occurs in parallel if both source active register set 420 and destination FIFO register set 430 are not full. Upon start up both source active register set 420 and destination FIFO register set 430 are empty.

Read controller/bus read interface 450 is active as long as all reads have not been issued. Read controller/bus read interface 450 and source active register set 420 becomes idle after the final read for a data transfer issues. Tracking of read data is logically associated with the write command and destination FIFO register set 430. This allows read controller/bus read interface 450 to begin processing the next data transfer as quickly as possible even though read data for the prior data transfer is still in flight. When source active register set 420 becomes idle, destination FIFO register set 430 will continue to be busy until it completes its writes since reads always happen before writes for a given data transfer.

If transfer controller 400 has more than one entry in destination FIFO register set 430 and a new data transfer has been programmed via program register set 410, then program register set 410 will load source active register set 420 and the appropriate entry of destination FIFO register set 430. This continues until destination FIFO register set 430 is full. Thus source active register set 420 is able to process data transfers ahead of destination FIFO register set 430 limited by the FIFO depth. This is called data transfer pipelining.

Destination FIFO register set 430 becomes active as soon as a single data transfer enters the FIFO. Each individual entry becomes idle after all write commands and write data for that data transfer have issued. Destination FIFO register set 430 as a whole is idle when no data transfer writes are pending.

As previously stated a write to program register set 410 B dimension index register triggers a data transfer. The VBus master device does not have to write to all registers. Program register set 410 maintains previous values upon writes to source active register set 420 and destination FIFO register set 430. It is feasible that a VBus master device could set up program registers once, and initiate the same transfer multiple times by only writing to the B dimension index register to trigger the transfer. Note that transfer controller 400 processes data transfers in the order received.

Read controller/bus read interface 450 issues optimally sized read commands based on static information without regard for the state of the FIFO. The optimally sized command does not change based on FIFO state. The FIFO state dictates when a read command can be scheduled. Read controller/bus read interface 450 can only issue an optimally sized read command when the read return data is guaranteed space in channel FIFO 440. Read controller/bus read interface 450 must track the free space within channel FIFO 440. A FREESPACE parameter is initialized at the depth of channel FIFO 440. Read controller/bus read interface 450 decrements FREESPACE every time read command issues according to the length of the read command. FREESPACE is incremented when data is removed from channel FIFO 440 by write controller/bus interface 450. Another read command cannot issue unless FREESPACE exceeds the data size of the next read.

The number of outstanding read commands for a single data transfer is limited by the VBus command pipelining limitation and channel FIFO 440 space limitation. In most cases, the channel FIFO 400 space limitation will be the limiting factor.

The number of outstanding data transfers is limited by the number of destination FIFO register set 430 entries. In the preferred embodiment this could be 1, 2 or 4 entries. As previously stated read controller/bus interface 450 can only issue a read command if channel FIFO 440 has space to store the return data.

A single data transfer must target a single source peripheral endpoint guaranteed to return all data from a single master in order. However, back-to-back data transfers are not guaranteed to be to the same source endpoint. Therefore, there is no guarantee that the read return data from the two different data transfers are returned in order. Therefore, read controller/bus interface 450 is responsible for tracking channel FIFO 440 allocation for the reads issued for different data transfers so that the data is spatially stored in channel FIFO 440 in the time order in which the commands were issued. Regardless of time ordering of return data, destination FIFO register set 430 and write controller/bus interface 460 only issue write commands in FIFO order relative to the data transfer. If the source issues reads for a first data transfer followed by reads for a second data transfer, there is a chance that the return data for the second data transfer would be returned first. In this event the entry at the head of destination FIFO register set 430 is allocated to the first data transfer. Therefore transfer controller 400 will do nothing with the second data transfer return data. Write controller/bus interface 460 will wait for the appropriate amount of first data transfer return data to land before sending the write command for this first data transfer.

Write controller/bus interface 460 issues optimally sized write commands which do not change based on channel FIFO 440 state. The state of channel FIFO 440 controls a write command can be scheduled. Write controller/bus interface 406 must wait to issue any new write command until a final data phase of a write in progress. Write controller/bus interface 460 must track the amount of data store channel FIFO 440. A DATAOCC parameter is initialized to zero. The DATAOCC value is incremented when read return data is stored in channel FIFO 440. The DATAOCC value is decremented every time a write command issues according to the amount of data that scheduled to be written. Write controller/bus interface 460 can only issue an optimally sized write command when that amount of data is available in channel FIFO 440. Thus DATAOCC must be greater than the amount of data to be written. Write controller/bus interface 440 will always drive a new write command exactly one cycle prior to the write data being driven.

Number of outstanding write commands within a single data transfer awaiting write confirmation is limited by the number of unique ID values available. Each write command is uniquely identified via a command ID (CID) value allocated when a write transaction is issued. The CID is de-allocated when the write status for that CID has returned. A CID cannot be reused prior to the write status being returned. In the preferred embodiment the CID is a 4-bit value, thus only 16 write commands can be outstanding. If an additional unique CID is unavailable, then write controller/bus interface 460 cannot issue another write command.

Channel controller 320 may request that transfer controller 400 return completion information. This completion information is relayed by bus completion interface 470 based upon the write status of the peripheral serviced. As write commands are issued to the endpoint peripheral with a CID tag, write controller/bus interface 460 populates a lookup table indexed by CID value tracking the endpoint peripheral. When write status is received from the endpoint peripheral, the write status is used to index back into the lookup table to extract the stored information. If the write status indicates completion of a last write of the data transfer, this status is relayed to channel controller 320.

Figure 11A:
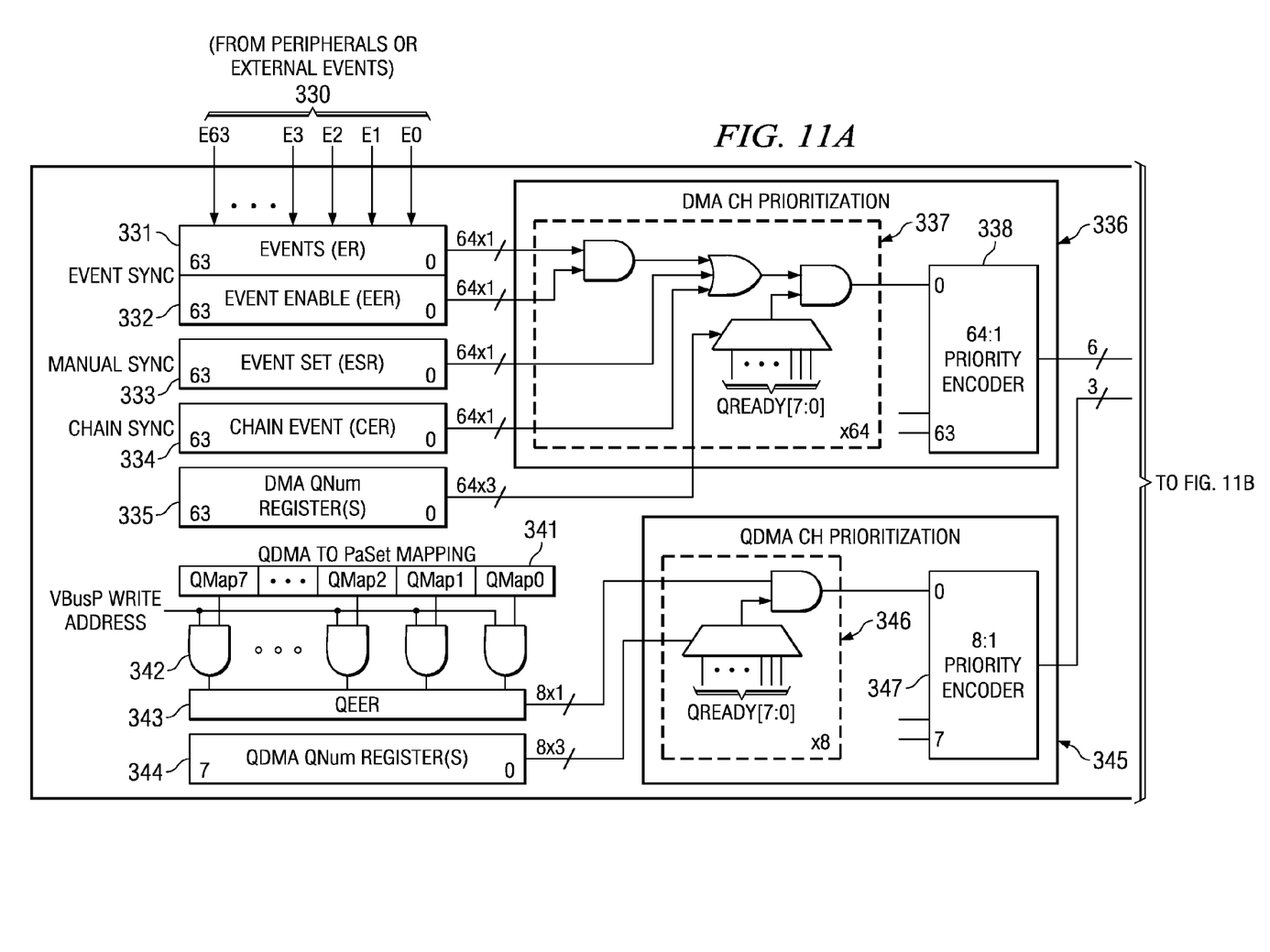
FIGS. 11A and 11B together illustrate the details of channel controller.
Figure 11B:
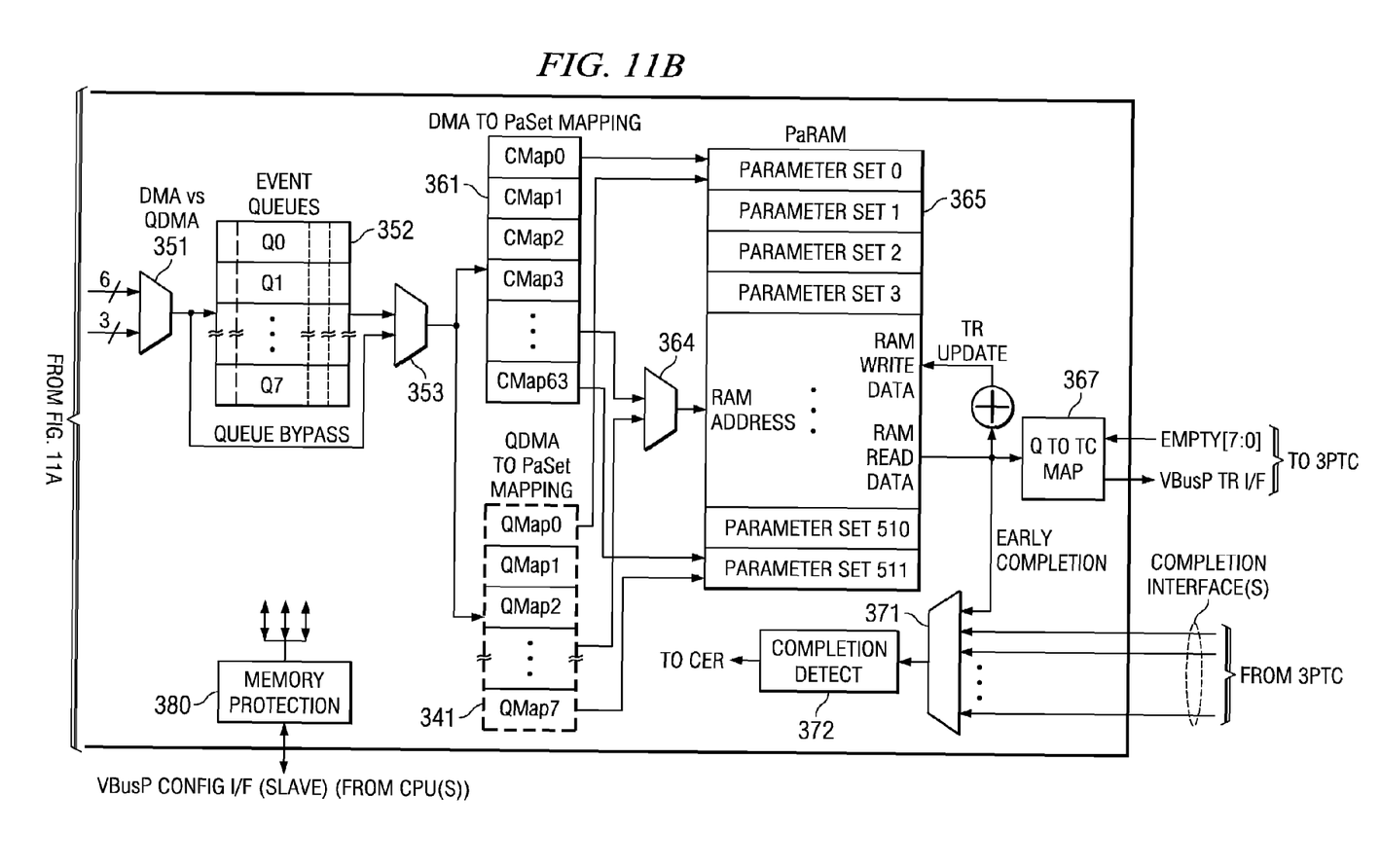

FIGS. 11A and 11B together illustrate the details of channel controller 320. Channel controller 320 serves as the front end interface of the data transfer system. Channel controller 320 supports up to 64 direct memory access (DMA) channels and up to 8 QDMA channels. A channel is a specific event that can cause a data transfer request to be submitted to transfer controller 310. The 64 DMA Channels can be triggered by external events 330. The 8 QDMA Channels are triggered by a VBus write to a designated QDMA trigger word.

External events 330 are received in corresponding bits in event register (ER) 331. Responsiveness to individual events 330 is controlled by a corresponding bit in event enable register (EER) 332. Receipt and storage of an event signal 330 together with the corresponding enable bit is submitted to DMA Channel prioritization 336.

Writing a '1' to a bit in event set register (ESR) 333 initiates a transfer request as if the corresponding event occurred. ESR 333 operates independent of ER 331 and does not need to be enabled. ESR 333 operates as if always enabled. This allows an external master device to manually submit data transfer requests. Once an event is set in ESR 333 it can only be cleared via hardware.

Chained event register (CER) 334 operate in parallel with corresponding bits of ER 331. When a chained completion code is detected, a transfer completion code determines a bit in CER 334 to be set. CER 334 has no enable, generation of a chained completion code must be enabled in the PaRAM entry that generates the chained completion code. When a bit is set in CER 334, this is immediately evaluated as a TRSync in parallel with the events from ER 331 and ESR 333.

DMA QNum registers 335 store queue numbers for corresponding events 330. Thus each bit in ER 331 has a corresponding queue number stored in DMA QNUM registers 335. This assigns a queue number to each corresponding event. This queue number is used in tracking as will be described below.

DMA Channel prioritization 336 selects one event per cycle to add to event queues 352 based upon event priority. Each event has an assigned circuit 337 which conditions the input signal. Circuit 337 generates an output only if the received event is enabled in EER 332, or an event set occurs in ESR 333 or a chain event is recognized by CER 334. The signal is further conditioned on the assigned queue number from DMA QNum registers 335 selecting a ready queue as determined by the qready signals. The 64:1 priority encoder 338 selects arbitrates among the successfully conditioned pending events and selects only one of up to 64 triggers for submission to event queue 352 via multiplexer 351. The winning event is queued into event queue 352. There the event awaits its turn for submission to transfer controller 310. As described each event is assigned a queue number by DMA QNUM registers 335. Each event queue is serviced in FIFO order, with a maximum of 16 queued events per event queue. Event queues are serviced with fixed priority based upon the corresponding queue selected by the QNum.

Channel controller 320 recognizes QDMA event upon a VBus configuration write to an address that matches the value programmed in the corresponding QDMA to PaSet Mapping registers 341 if the QDMA channel is enabled via the corresponding bit in QDMA Event Enable register (QEER) 343. This operates similar to EER 332.

QDMA to PaSet Mapping registers 341 includes a plurality of QMapn registers. The preferred embodiment of this invention includes eight QMap registers for eight QDMA channels. These QMap registers are individually memory mapped writeable via VBus configuration writes. A plurality of address comparators 342 compare the VBus write address with a corresponding QMap register 341. A detected match triggers signal that initiates a QDMA operation.

QDMA QNum registers 344 store queue numbers for corresponding QMAP triggers 341. Thus each address in QMAP 341 has a corresponding queue number stored in QDMA QNUM registers 344. This assigns a queue number to each corresponding QDMA in a manner similar to that described above.

QDMA Channel prioritization 345 selects one QDMA per cycle to add to event queues 352 based upon event priority. Each event has an assigned circuit 346 which conditions the input signal. Circuit 346 generates an output only if the received QDMA is enabled in QEER 343. The signal is further conditioned on the assigned queue number from QDMA QNum registers 344 selecting a ready queue as determined by the qready signals. The 8:1 priority encoder 347 selects arbitrates among the successfully conditioned pending events and selects only one of up to 8 triggers for submission to event queue 352 via multiplexer 351. The winning event is queued into event queue 352. There the event awaits its turn for submission to transfer controller 310. All DMA requests have priority over all QDMA requests in multiplexer 351.

Events are extracted from event queues 352 as soon as transfer controller 310 can receive a new data transfer request. As an event is extracted from event queue 352, the associated PaRAM entry is processed and submitted to transfer controller 310. Channel controller 320 updates the appropriate counts and addresses in the PaRAM Entry in anticipation of the next trigger event for that PaRAM Entry.

The only difference between a QDMA and a DMA data transfer is the specific means of generating and recognizing a transfer request, called synchronization. DMA and QDMA transfer types can be mixed freely to perform various types of transfers. DMA channel transfer request synchronization can be generated from three sources: event triggered via an external event 330; manually triggered by a CPU write or VBus configuration write to ESR 333; and chain synchronization by setting a CER 334 bit upon detection of a chaining completion code on the completion interface for channel N. QDMA channel request triggering occurs in two ways: auto-triggered by a CPU write or any VBus configuration write to an address matching the address defined by the QMap 341 when that QDMA channel is enabled in QEER 343; and link-triggered upon a link update to a PaRAM address that matches the QMap 341 when that QDMA channel is enabled in QEER 343.

Figure 12:
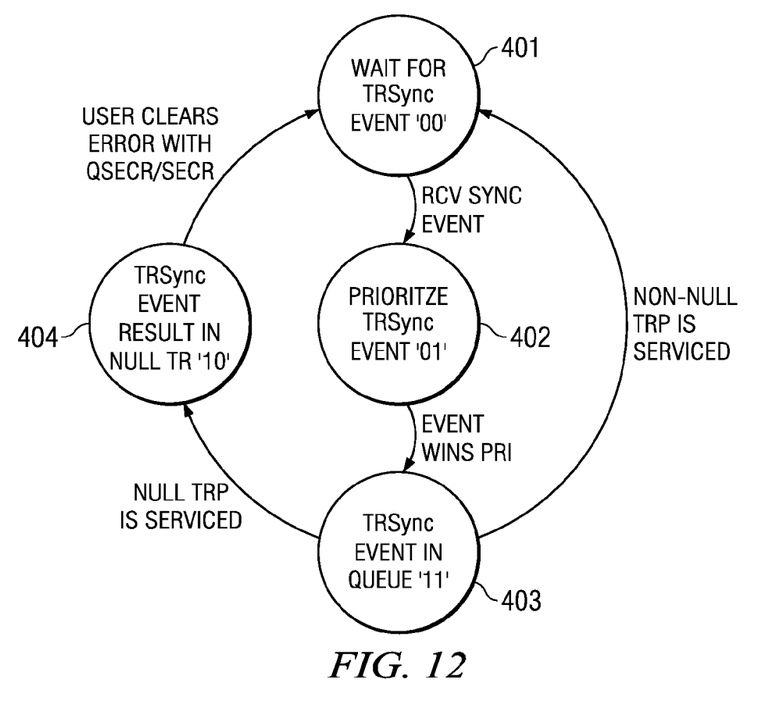
FIG. 12 illustrates states for a transfer request synchronization event.

FIG. 12 illustrates states for a transfer request synchronization event as it proceeds through channel controller 320. There are 4 states represented by a 2 bit binary field. State "00" 401 is an idle state waiting for a transfer request synchronization event. Upon receipt of a transfer request synchronization event, the state changes to state "01" 402. In state 402 a transfer request synchronization event has been received and is being prioritized in DMA/QDMA event arbitration. When the event wins the arbitration the state changes to state "11" 403. In state 403 the transfer request synchronization event has won prioritization and has been queued in event queue 352.

If the transfer request is a null transfer request, the state changes to state "10" 404. State 404 sets the EMX/QEMR register for the corresponding channel. The state returns to idle state 401 upon clearing the error condition in the QSECR of the SECR. If the transfer request was not a null transfer request, the transfer service request is serviced and the state returns to idle state 401.

Event queue 352 is the boundary between the event recognition portion of channel controller 320 and the transfer request submission portion of channel controller. Event queues 352 consists of a number of independent queues, where each queue is associated with a single transfer controller channel. Each queue is 16-entries deep. An event is placed at the tail of the appropriate event queue 352 if it wins prioritization versus the other events. Events are dequeued from the head of event queue 352 in order to be processed and submitted to transfer controller 310. Event queues 352 are unloaded in priority order. Event queues 352 may be implemented as either discrete registers or an 8-bit wide register file that is logically divided into a number of independent queues. Each queue includes 16 event entries which store the specific DMA or QDMA event number.

Upon reception of an event, an event number is stored in the corresponding event queue 352 as defined by DMA QNum 335 and QDMA QNum 344. The QNum stored in the appropriate queue of event queue 352 is an 8-bit entry that identifies the specific event type and event number. The two most significant bits uniquely identify all event types. These are listed in Table 1.

TABLE 1

| Bits | Event Type |
|------|------------|
| 00 | ER 331 |
| 01 | ESR 333 |
| 10 | CER 334 |
| 11 | QEER 343 |

The six least significant bits identify the event within the event type. For DMA events, these six least significant events identify up to 64 events. For QDMA events, these six least significant bits identify up to 8 events.

Event queue 352 indicates availability on a per queue basis via qready[7:0] signals. These qready signals are used in conditioning circuits 337 and 346. Event queue 352 is unloaded as soon as possible based upon the status signals from each transfer controller 310 via the tpcc_tcprogempty [7:0] signal. The queues are prioritized from lowest queue number to highest queue number.

The mapping between a specific transfer controller channel and a specific event queue is defined by DMA to PaSet mapping register 361 for DMA events and QDMA to PaSet mapping registers 341 for QDMA events. Note that FIG. 11B illustrates QDMA to PaSet mapping registers 341 in dashed lines below DMA to PaSet mapping registers 361 where this logic operation takes place. The dequeued value indexes into the appropriate entry of either DMA to PaSet mapping register 361 or QDMA to PaSet mapping register 341. This mapping points to an entry in PaRAM 365 storing data for the transfer request. This data is transferred to the corresponding transfer controller 310 to control the data transfer. If an event is ready to be queued and both event queue 352 is empty and the transfer controller 310 channel is empty, then the event bypasses event queue 352 and proceeds directly to PaRAM processing logic for submission to the corresponding transfer controller 310.

Figure 13:
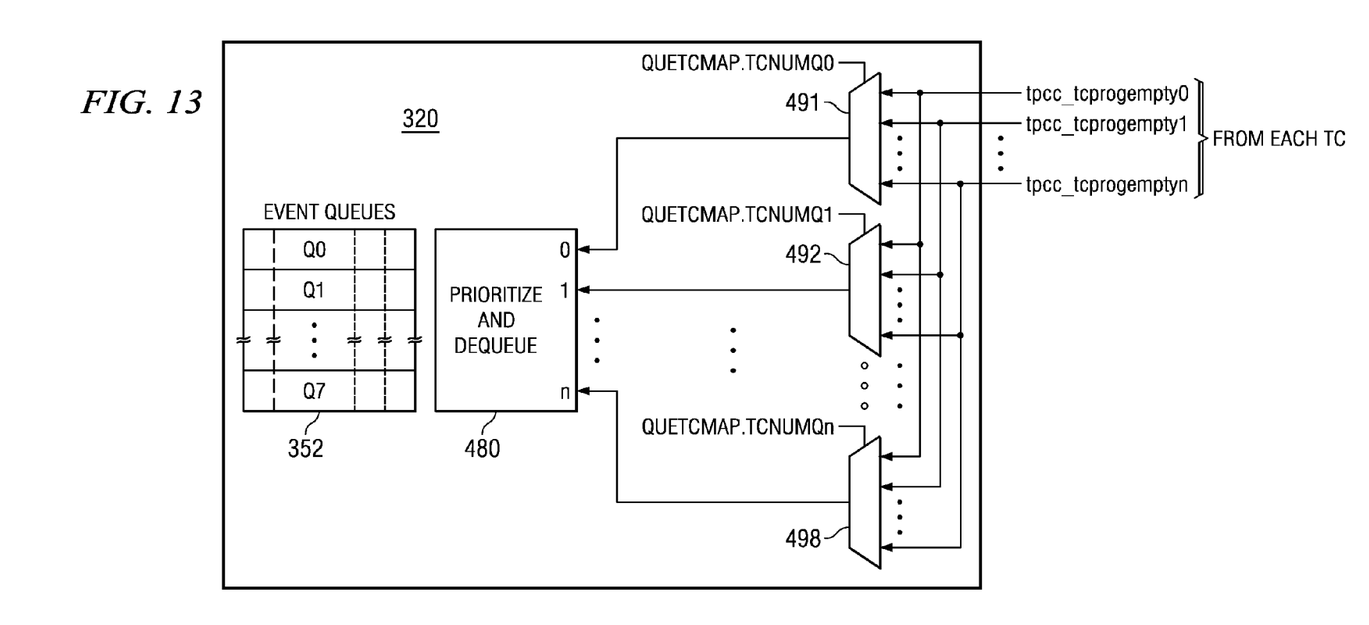
FIG. 13 illustrates circuits for de-queuing events in the event queues illustrated in FIG. 12.

Event queue to transfer controller mapping (Q to TC Map) registers 367 have two purposes. First, Q to TC Map registers 367 are used in the queue prioritization logic to associate the appropriate tpcc-tcprogempty[N-1:0] signal from plural transfer controllers to the appropriate queue number. FIG. 13 illustrates this use. Second, the Q to TC Map registers 367 are used during transfer request submission to select the appropriate transfer controller channel.

FIG. 13 illustrates de-queuing from event queues 352 upon completion of a transfer request. Completion signal tpcc-tcprogempty[N-1:0] are received from the plural transfer controllers. Each set of completion signals enters a corresponding multiplexer 491, 492 to 498. A control input QUETCMAP-TCNUMQn signal to each multiplex selects one of the input completion signals. The outputs of multiplexers 491, 492 to 498 are fed for prioritize and de-queue circuit 480. Coincidence of a completion signal with a corresponding mapping of queue number and transfer controller number permits the completion signal to reach prioritize and de-queue circuit 480. Prioritize and de-queue circuit 480 interacts with event queues 352 to de-queue the appropriate entry.

Figure 14:
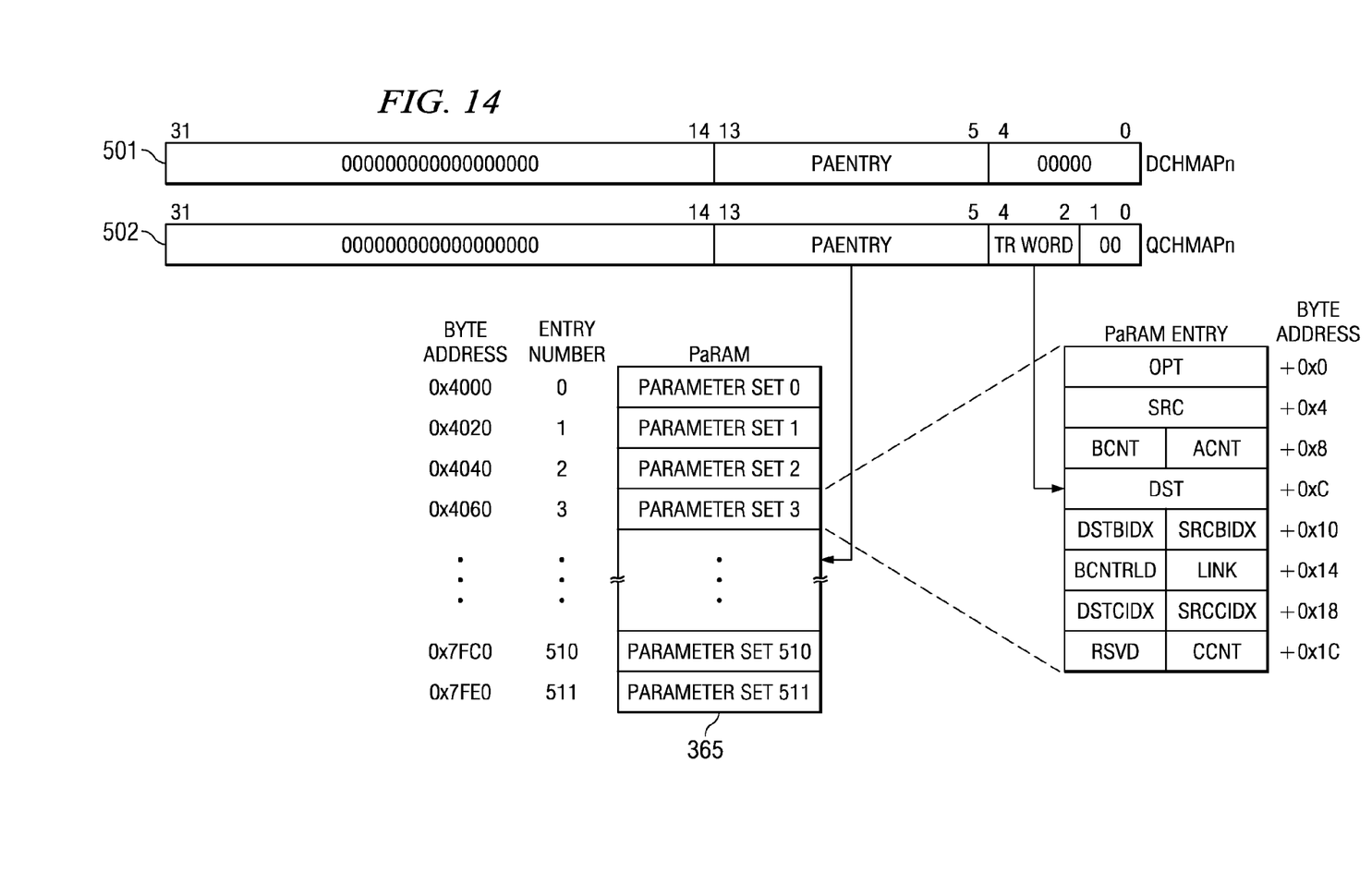
FIG. 14 illustrates how channel map registers index individual entries in the parameter RAM.

DMA to PaSet Mapping registers 361 and QDMS to PaSet mapping registers 341 causes each DMA and QDMA channel to be mapped into arbitrary locations in PaRAM memory 365. Each DMA channel map register (CCHMAPn) 501 and each QDMA channel map register (QCHMAPn) 502 includes a 9-bit PAENTRY (Parameter RAM Entry) field that defines the entry number in the maximum 512 deep entry PaRAM 365. This is illustrated in FIG. 14. QCHMAPn 502 also includes a pointer reference TR WORD. This is a 3-bit address pointing to one of eight words in the parameter set entry. 8-word address since each entry is 8-words in length. Each DMACHMAP register 501 provides a programmable mapping between the 64 DMA Channels and the corresponding location in the PaRAM memory map. Each QMACHMAP register 502 provides a programmable mapping between the 8 QDMA Channels and the corresponding location in the PaRAM memory map.

The sixth data word includes a B count reload (BCNTRLD) field and a link (LINK) field. The BCNTRLD field is a 16-bit unsigned value used to reload the BCNT field once the last array in the second dimension is transferred. The BCNTRLD field is only used when channel controller 320 decrements the BCNT value by one for each transfer request. When the BCNT reaches zero, then channel controller 320 decrements CCNT and uses the BCNTRLD value to reinitialize the BCNT value. The LINK field specifies the address within PaRAM 365 having data to reload the PaRAM entry for the current data transfer when complete. This process is called linking and will be further described below.

The seventh data word includes a destination C index (DSTCIDX) field and a source C index (SRCCIDX) field. DSTCIDX is a 16-bit signed value used for destination address modification for a third dimension. DSTCIDX provides a byte address offset from the beginning of the current array pointed to by DST address to the beginning of the first destination array in the next frame. SRCCIDX is a similar 16-signed value providing a destination byte address offset.

The eight data word includes a single 16-bit unsigned value that specifies the number of frames in a block.

Channel controller 320 permits linked data transfers. This mechanism reloads the current PaRAM entry upon its natural termination with another PaRAM Entry. The 16-bit LINK field specifies the byte address offset in the PaRAM of this next PaRAM entry in the link. Channel controller 320 ignores the 2 most significant bits and the 5 least significant bits of the LINK field. The upper two bits are ignored so that the user can program either a literal byte address or a PaRAM base-relative address. A literal address in the range form hex 4000 to hex 7FFF is treated as a PaRAM-base-relative value of hex 0000 to hex 3FFF. The lower-5 bits are ignored so that the LINK value points to a 32-byte aligned PaRAM entry as illustrated in FIG. 14.

A LINK value of hex FFFF is a NULL link. Rather than reload the current PaRAM entry with another PaRAM entry, a NULL link causes channel controller 320 to write hex 0 to all fields of the current PaRAM entry except for the LINK field which is set to hex FFFF. This makes the current PaRAM entry a null entry specifying a NULL link.

This channel chaining capability allows the completion of an transfer to set an event to trigger another transfer. This allows the user to chain several events through one event occurrence. To configure a channel controller 320 channel m to trigger another data transfer upon completion of the entire channel the PaRAM entry is programmed as follows. In the OPT data word set the TCC field (refer back to FIG. 5) to channel number m. The TCC field does not have to match the channel number. Set the TCCHEN field (see FIG. 5) to "1". A TCCHEN value of "0" disables chaining, "1" enables chaining.

Active Memory protection allows VBus read/write transfers to internal channel controller 320 resources to be accepted/denied based on user programmed permission characteristics. The internal address map of channel controller 320 is divided into multiple regions. Each region has an associated Memory Protect Permissions Attribute (MPPAn) register. The MPPA register defines the specific requester and types of requests that are allowed in that region. Upon receipt of a VBus transaction via the configuration interface to memory protection circuit 380, channel controller 320 identifies the MPPA register associated with the accessed address or resource (cfgaddress). Channel controller 320 maps the VBus request information to permissions granted by the identified MPPA register. Channel controller 320 then accepts or denies the VBus transaction base upon its type and the transactions permitted by the corresponding MPPA register. Table 2 lists mapping of the address regions to MPPA registers.

TABLE 2

| MPPA Register | Register Name | Mapping Address Range | PaRAM Name | Mapping Address Range |
|---|---|---|---|---|
| MPPAG | Global Range | hex 0000 to hex 1FFC | n/a | n/a |
| MPPA0 | DMA Shadow 0 | hex 2000 to hex 21FC | Region 0 | hex 4000 |
| MPPA1 | DMA Shadow 1 | hex 2200 to hex 23FC | Region 1 | hex 4000 + (1/NR) * PD |
| MPPA2 | DMA Shadow 2 | hex 2400 to hex 24FC | Region 2 | hex 4000 + (2/NR) * PD |
| MPPA3 | DMA Shadow 7 | hex 2E00 to hex 2FFC | Region 7 | hex 4000 + (7/NR) * PD |

In the last column of Table 2: NR is the number of regions within the memory map; and PD is the PaRAM 365 depth in bytes.

Figure 15:
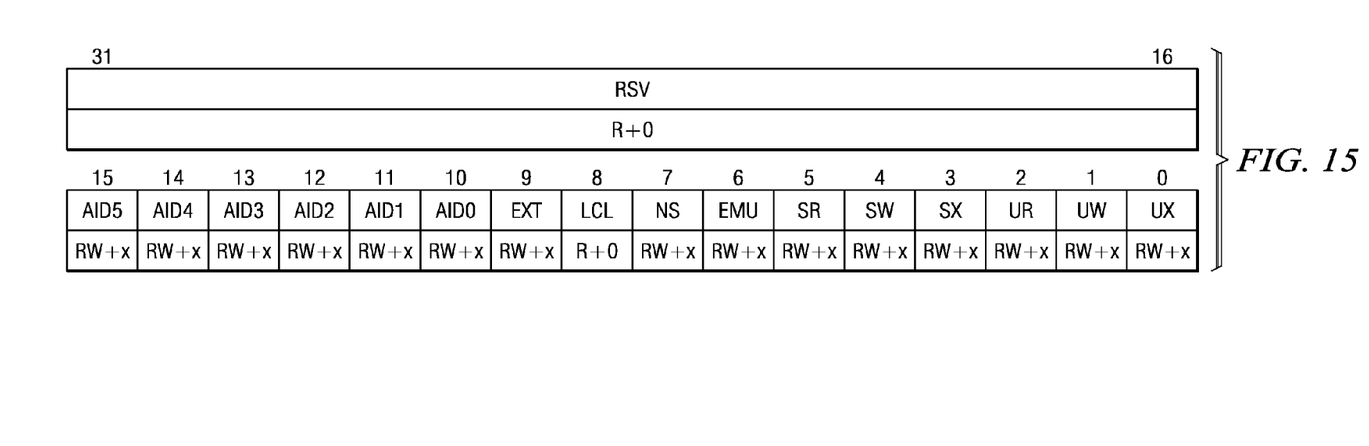
FIG. 15 illustrates the memory protect permissions attribute register.

FIG. 15 illustrates the fields of each MPPA register according to the preferred embodiment. Table 3 lists the definitions of the various fields of each MPPA register illustrated in FIG. 15.

TABLE 3

| Field | Description |
|---|---|
| UX | User Execute Permission<br>0 - not allowed<br>1 - allowed |
| UW | User Write Permission<br>0 - not allowed<br>1 - allowed |
| UR | User Read Permission<br>0 - not allowed<br>1 - allowed |
| SX | Supervisor Execute Permission<br>0 - not allowed<br>1 - allowed |
| SW | Supervisor Write Permission<br>0 - not allowed<br>1 - allowed |
| SR | Supervisor Read Permission<br>0 - not allowed<br>1 - allowed |
| EMU | Emulation Security Permission<br>0 - Emulation read/write not allowed<br>1 - Emulation read/write allowed |
| NS | Secure Access Permission<br>0 - Page secure, only secure mode access permitted |

TABLE 3-continued

| Field | Description |
|---|---|
| | 1 - Page not secure |
| LCL | Reserved |
| EXT | External Allowed ID |
| | 0 - Requests with PrivID = 6 not allowed |
| | 1 - Requests with PrivID = 6 allowed if permitted by permission settings UW, UR, SW, SR |
| AIDm | Allowed ID M |
| | 0 - Requests with PrivID = M not allowed |
| | 1 - Requests with PrivID = M allowed if permitted by permission settings UW, UR, SW, SR |

What is claimed is:

1. A data transfer control apparatus comprising:
a channel controller including
    an event input receiving each of a plurality of event signals indicative of occurrence of corresponding events,
    an event priority encoder connected to said event input selecting one of said event signals indicating occurrence of an event,
    a bus write address input carrying the address of a bus write,
    a write priority encoder connected to said bus write address input selecting one of a set of memory writes to predetermined memory addresses;
    an event queue connected to said event priority encoder and said write priority encoder storing a queue of data transfer requests corresponding to event signals and memory writes to said predetermined memory addresses;
    an event to transfer controller table storing a transfer controller number corresponding to each event, and
    a write to transfer controller table storing a transfer controller number corresponding to each bus write address; and
a plurality of transfer controllers connected to said event queue, said event to transfer controller table and said write to transfer controller table for controlling data transfers corresponding to data transfer requests recalled from said event queue as selected by said transfer controller number.

2. A data transfer control apparatus comprising:
a channel controller including
    an event input receiving each of a plurality of event signals indicative of occurrence of corresponding events,
    an event priority encoder connected to said event input selecting one of said event signals indicating occurrence of an event,
    a bus write address input carrying the address of a bus write,
    a write priority encoder connected to said bus write address input selecting one of a set of memory writes to predetermined memory addresses;
    an event queue connected to said event priority encoder and said write priority encoder storing a queue of data transfer requests corresponding to event signals and memory writes to said predetermined memory addresses;
    an event to transfer controller table storing a transfer controller number corresponding to each event, and
    a write to transfer controller table storing a transfer controller number corresponding to each bus write address; and
a plurality of transfer controllers connected to said event queue, said event to transfer controller table and said write to transfer controller table for controlling data transfers corresponding to data transfer requests recalled from said event queue as selected by said transfer controller number, wherein said plurality of transfer controllers are independent whereby plural transfer controllers can operate simultaneously in parallel.

3. The data transfer control apparatus of claim 2, further comprising:
a data bus connecting a plurality of data sources and data destinations; and
wherein each of said plurality of transfer controllers further includes
    a read bus interface connected to said data bus for generating data read transactions on said data bus,
    a write bus interface connected to said data bus for generating data write transactions on said data bus, and
    wherein said read bus interface and said write bus interface are bus masters which arbitrate with other bus masters on said data bus in the case of blocking accesses directed to interfering devices or address ranges.

* * * * *